Patented Mar. 31, 1931

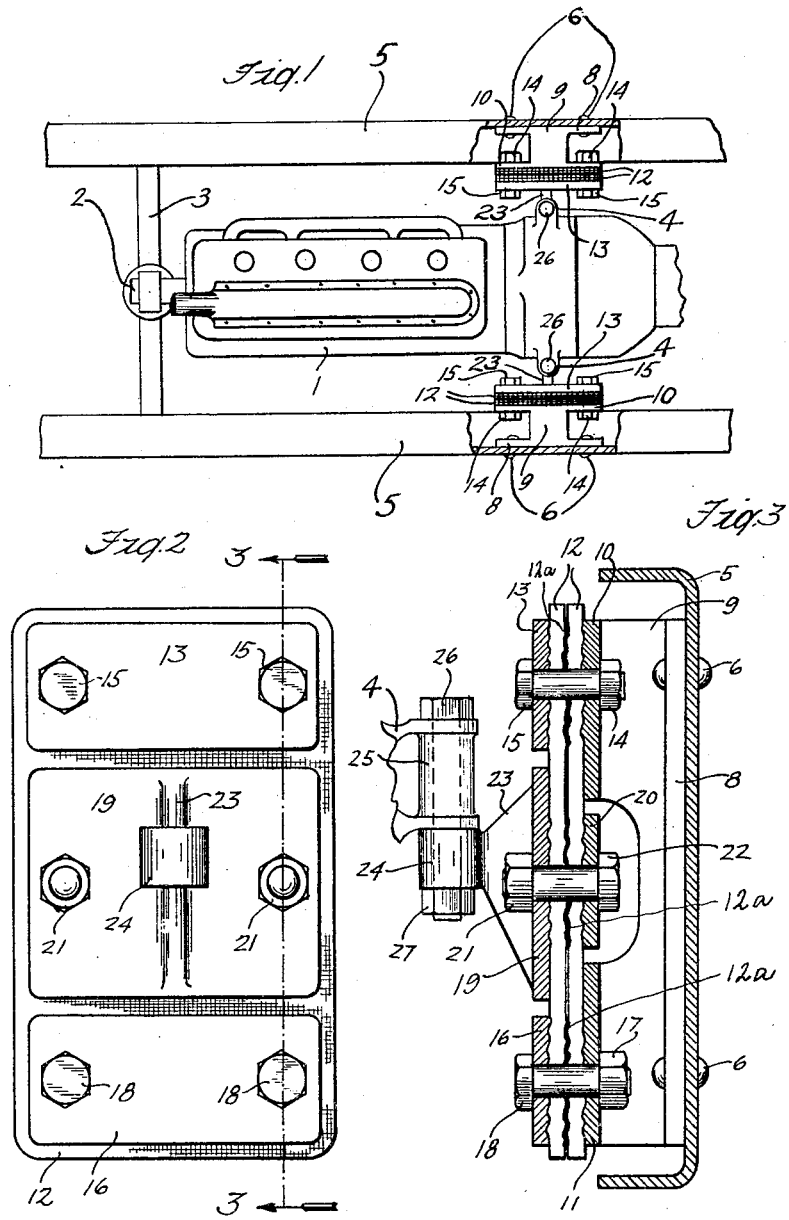

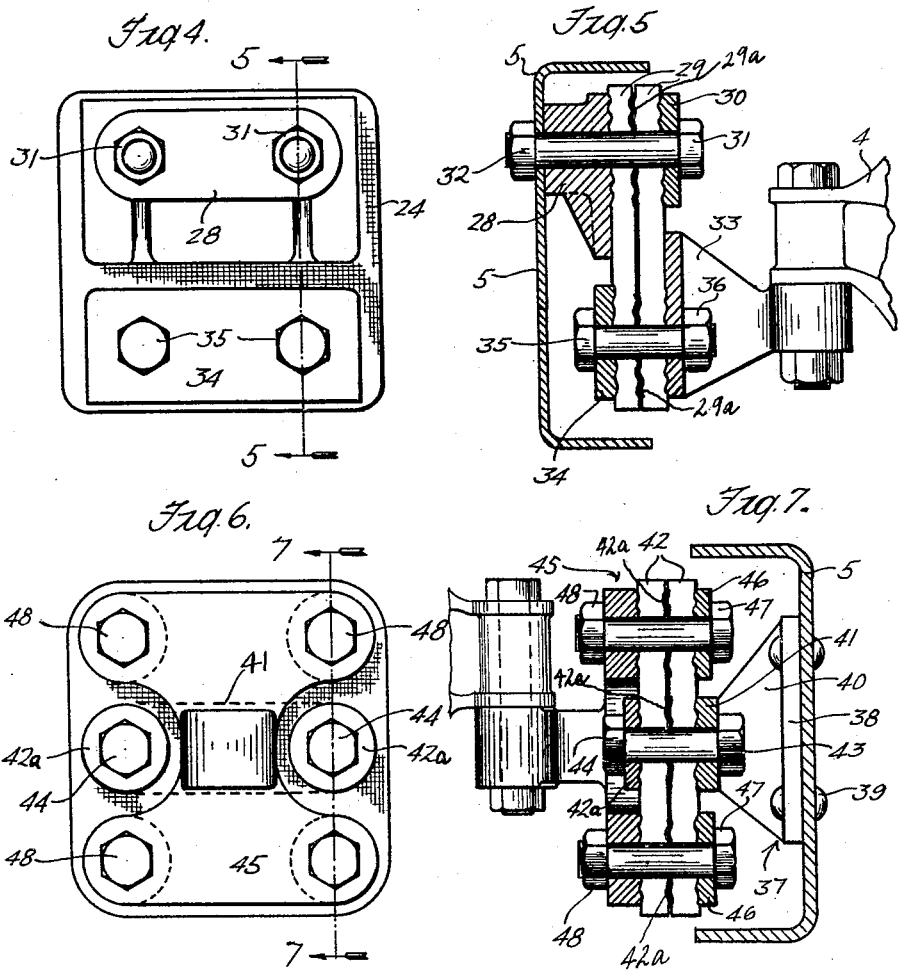

1,798,580

UNITED STATES PATENT OFFICE

HARVEY W. BELL, OF ARDSLEY ON HUDSON, NEW YORK, ASSIGNOR TO THE BELOYT CORPORATION, OF NEW YORK, N. Y., A CORPORATION OF DELAWARE

NONRIGID BODY MOUNTING

Application filed August 24, 1926. Serial No. 131,141.

This invention relates to non-rigid mountings for bodies and is shown by way of illustration as applied to the mounting of a motor upon the frame of a motor vehicle.

Certain features disclosed but not claimed herein are claimed in my pending application, Serial No. 596,250, now Patent No. 1,727,804, flexible connections for motor vehicles, filed October 23, 1922.

In the mounting of a body, such as the motor, upon the frame of a motor vehicle, it is desirable that the motor be permitted to vibrate to a limited extent, but that the transmission of shocks of objectionable degree between the motor and the frame be avoided, and particularly that sidewise movements of the motor and frame be positively checked and confined within predetermined limits.

To this end provision is made, in my pending application referred to, of supports arranged in opposed relation at opposite sides of the motor in which the motor is suspended from the frame by means of flexible, inelastic tension plates joined to the motor and to the frame by rigid connecting members which overlap and have bearing relation through the plates to positively check sidesway.

The present invention has to do with a mounting of this same general character and has for its principal object to distribute the weight and pull upon the flexible plates in such manner that wear and elongation of the flexible plates will be minimized.

In the drawings forming a part of this specification:

Figure 1 is a fragmentary plan view of a motor vehicle showing a motor mounted on the frame by means of the improved mounting of the present invention;

Figure 2 is an elevation of one of the supporting units of this mounting;

Figure 3 is a sectional elevation on the line 3—3 of Figure 2 looking in the direction of the arrows, and showing parts of the motor and frame connected to the mounting unit;

Figure 4 is an elevation of a modified form of support intended particularly for use on the lighter makes of vehicles;

Figure 5 is a sectional elevation on the line 5—5 of Figure 4 looking in the direction of the arrows, and showing parts of the motor and frame connected to the mounting unit;

Figure 6 is an elevation of a further modified form of support; and

Figure 7 is a sectional elevation on the line 7—7 of Figure 6 looking in the direction of the arrows, and showing parts of the motor and frame connected to the mounting unit.

The motor 1 comprises a forwardly projecting hub 2 which may be mounted upon a cross member 3 of the vehicle frame in any suitable manner, but preferably through flexible shock absorbing means, as shown, for example, in my application above referred to.

At the rear end of the motor, arms 4 project outward for attachment to the side frame members 5 through the novel supports to be described.

The right side frame member 5 has a motor supporting bracket rigidly secured thereto by means of rivets 6. This bracket comprises a vertical, longitudinal web 8 for securement to the side frame member, an inwardly extending, transverse, vertical web 9, and longitudinally extending webs 10 and 11 parallel to the web 8 but spaced inwardly therefrom. The webs 10 and 11 are spaced vertically, leaving a central, open portion in the bracket for the reception and play of certain connecting elements of the support to be described.

The webs 10 and 11 may be corrugated on their inner faces to enable them to exert a firm clamping grip. One or more plates 12 of flexible, substantially inelastic, inextensible material, such as rubberized fabric, are secured to the upper web 10 by means of a corrugated clamping plate 13, bolts 15 and nuts 14. The flexible plate or plates extend downward across the gap between the web 10 and the web 11 and are clamped to the corrugated face of the web 11 by means of a corrugated clamping plate 16, bolts 18 and nuts 17. Intermediate the webs 10 and 11 the flexible plates 12 are clamped to a corrugated plate 19 by means of a clamping plate 20, bolts 22 and nuts 21. The plate 19 has a web or bracket 23 projecting inwardly therefrom which terminates in a sleeve 24. This sleeve may be located beneath a sleeve 25 on the arm 4 at the side of the motor, and a rigid connection may be effected by means of a bolt 26 passed through the sleeves and securely clamped thereto by nut 27.

Corrugated washers 12ª are preferably interposed between the flexible plates 12 at each point of clamping.

The support at the left side of the motor is a duplicate of the support at the right side.

It will be observed that in these supports the clamping plates and webs all extend throughout substantially the entire width of the flexible plates, the margins of the flexible plates, however, being wholly unclamped. It will also be observed that the clamping is effected in each instance between corrugated faces which are drawn tightly together by widely spaced bolts, and that the bolts are arranged in vertically aligned sets. By this arrangement the weight of the motor is caused to exert a direct vertical pull upon the flexible links, and this pull is distributed evenly throughout the entire width of the plates. The plates, moreover, are so disposed that the threads, either the warp or woof, are vertical, so that the load applied to the plates is parallel to these threads, in which position they are most effective for resisting tension. Thus, the tendency to produce permanent distortion and elongation is reduced and adequately resisted.

It is a particular feature, also, that the plates 19 connected to the motor, overlap the vertical webs 10 and 11 connected to the frame. Due to this overlapping relation it is impossible for the motor to move more than a very short distance toward the right before such movement is positively checked by the co-action of the overlapping members at the right. Similarly movement of the motor toward the left is quickly and positively checked by the co-action of the overlapping members of the left hand support. The flexible plates as a result of the described arrangement serve both as tension supports for suspending the motor and resisting movements of the motor in the direction of the planes of the plates, and as compression buffers for cushioning the shock when the transverse movement is positively checked by the overlapping members.

In the form of the invention shown in Figures 4 and 5, the side frame member 5 supports a clamping bracket 28 having a corrugated inner face. One or more flexible links 29 are clamped to this bracket by means of a clamping plate 30, bolts 31 and nuts 32. The bolts 31 pass also through the side frame member 5 for securing the bracket 28 to the side frame member.

A clamping bracket 33 at the opposite side of the flexible plates from the bracket 28 is clamped to the lower ends of the flexible plates by means of a corrugated clamping plate 34, bolts 35 and nuts 36. The bracket 33 is secured to a supporting arm 4 of the motor in the manner already described. The brackets 28 and 33 are arranged to overlap one another for providing a positive check against sidewise movement of objectionable extent. In this form of construction, as in the form previously described, the clamping members extend throughout almost the entire width of the flexible plate, the clamping bolts are spaced widely apart, the bolts are arranged in vertical alignment, and the fabric plates are mounted so that the threads are disposed vertically.

Corrugated clamping washers 29ª are preferably interposed between the flexible plates 29 at each point of clamping.

This form differs from the previously described form of the invention, however, in that the connection to the motor is not arranged between vertically spaced connections to the side frame member. It has been found that this form of mounting is entirely satisfactory, particularly for the lighter makes of automobiles. The positive check afforded between overlapping brackets 28 and 33 at the opposite sides of the motor, maintains the flexible plates 29 substantially vertical under all operating conditions, so that any upward movement of the motor is directly opposed by the resistance of the flexible plates to compression. These plates are of substantially incompressible material, and hence provide sufficient opposition to upward displacement of the motor.

In the form of the invention shown in Figures 6 and 7 the side frame member 5 has mounted thereon a bracket 37 comprising a longitudinally extending, vertical web 38 rigidly secured to the side frame member, as by rivets 39. The bracket 37 also includes a transversely extending, vertical web 40 and a long, narrow, longitudinally extending, vertical web 41 having a corrugated clamping face. One or more flexible, inelastic plates 42 are clamped substantially midway of their height to the web 41 by means of corrugated clamping washers 42ª, bolts 44 and nuts 43, the bolts and nuts being located at the opposite ends of the web 41. At the opposite side of the flexible plates from the web 41 provision is made of an I-shaped clamping plate 45 for securing the flexible plates to the motor. The plate 45 extends at its lower and upper ends for substantially the full width of the flexible plates, but has a reduced waist portion that passes between the clamping washers 42ª and crosses the clamping web 41. The clamping plate 45 is secured at its upper and lower ends to the flexible plates by means of clamping washers 46, bolts 47 and nuts 48.

Corrugated clamping washers 42ᵇ are preferably interposed between the flexible plates 42 at each point of clamping.

In this form of the invention, as in those previously described, the flexible plates are disposed with their threads vertically, and are clamped throughout substantially their full widths and the connecting elements are arranged in vertically aligned sets. The waist portion of the plate 45 cooperates with the web 41 to provide a positive check against sidesway for the purpose previously indicated.

Variations may be resorted to within the scope of the invention, and parts of the improvements may be used without others.

What I claim is:

1. In combination, a supporting body, a supported body and vibration insulating means for mounting the supported body on the supporting body without transmitting vibrations or shocks of objectionable degree between the bodies, said mounting comprising a plurality of supports disposed in opposed relation, each support includng a vertically disposed tension plate of flexible, substantially inelastic, substantially inextensible material, and rigid connecting members on the supported and supporting bodies respectively, one of said connecting members comprising a vertical web clamped to a portion of the flexible plate between the upper and lower ends of the plate and throughout substantially the entire width thereof, and the other connecting member comprising upper and lower vertical webs above and below the first web, located at the opposite side of the flexible plate therefrom and also clamped to the plate throughout substantially the entire width of the plate, said upper and lower webs overlapping the first mentioned web, the opposed supports being so spaced from each other that, due to the overlapping arrangement of the connecting webs, the supports are effective to coact throughout substantially the entire width of the flexible plate to positively check and limit movement of the supported body relative to the supporting body.

2. In combination, a supporting body, a supported body and vibration insulating means for mounting the supported body on the supporting body without transmitting vibrations or shocks of objectionable degree between the bodies, said mounting comprising a plurality of supports disposed in opposed relation, each support including a vertically disposed tension plate of flexible, substantially inelastic, substantially inextensible material, and rigid connecting members on the supported and supporting bodies respectively, one of said connecting members comprising a vertical member clamped to the flexible plate throughout substantially the entire width thereof, and the other connecting member comprising a vertical member clamped to the flexible plate below the first throughout substantially the entire width of the plate, said connecting members being arranged in partially overlapping relation and being disposed in such proximity to the plate in the overlapping portions that they serve as thrust members acting through the plate throughout substantially the entire width thereof and utilizing it as a compression buffer to limit lateral movement of the supported body in one direction, the connecting members of the opposed supports being disposed in complementary relation to act jointly to positively check and control the extent of lateral movement of the supported body.

3. In a motor vehicle, the combination with the frame and motor thereof, of a mounting for the motor comprising a support including a vertically disposed tension plate of flexible, substantially inelastic, substantially inextensible material, and rigid members connecting the plate to the motor and the frame respectively, the frame connected member being clamped to the flexible plate throughout substantially the entire width thereof, and the motor connected member being clamped at a lower point to the flexible plate throughout substantially the entire width thereof, said connecting members being arranged in partially overlapping relation and being disposed in such proximity to the plate in the overlapping portions that they serve as thrust members, acting through the plate throughout substantially the entire width thereof and utilizing it as a compression buffer to positively check horizontal movement of the motor in one direction, and means cooperating with said support and disposed in opposed relation thereto for limiting horizontal movement of the motor in the opposite direction.

In testimony whereof I have affixed my signature to this specification.

HARVEY W. BELL.